US006980332B2

(12) United States Patent
Simske

(10) Patent No.: US 6,980,332 B2
(45) Date of Patent: Dec. 27, 2005

(54) SYSTEM AND METHOD OF AUTOMATED SCAN WORKFLOW ASSIGNMENT

(75) Inventor: Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 09/892,299

(22) Filed: Jun. 26, 2001

(65) Prior Publication Data

US 2002/0196479 A1  Dec. 26, 2002

(51) Int. Cl.[7] .................... H04N 1/40; H04N 1/46; H04N 1/04; G06K 9/38
(52) U.S. Cl. ............... 358/445; 358/446; 358/447; 358/461; 358/463; 358/504; 358/475; 358/509; 382/270; 382/273
(58) Field of Search .................. 358/468, 448, 358/462, 453, 486, 445, 446, 447, 461, 463, 358/504, 475, 509; 382/176, 318, 319, 270, 382/273

(56) References Cited

U.S. PATENT DOCUMENTS

| | | | | |
|---|---|---|---|---|
| 4,034,341 A | * | 7/1977 | Isono et al. | 382/101 |
| 4,823,395 A | | 4/1989 | Chikauchi | 382/48 |
| 5,296,939 A | * | 3/1994 | Suzuki | 358/453 |
| 5,682,540 A | * | 10/1997 | Klotz et al. | 715/505 |
| 5,818,976 A | | 10/1998 | Pasco et al. | 382/289 |
| 5,901,253 A | | 5/1999 | Tretter | 382/289 |
| 5,978,519 A | | 11/1999 | Bollman et al. | 382/282 |
| 6,151,426 A | | 11/2000 | Lee et al. | 382/319 |

FOREIGN PATENT DOCUMENTS

EP    0991264 A2    5/2000

OTHER PUBLICATIONS

Wahl, Friedrich M.; Wong, Kwan Y; and Casey, Richard G., "Block Segmentation and Text Extraction in Mixed Test/Image Documents," Computer Graphics and Image Processing, Academic Press, Inc., pp. 375-390, 1982, San Jose, California.

O'Gorman, Lawrence, "The Document Spectrum for Page Layout Analysis," The Institute of Electrical and Electronics Engineers, Inc., vol. 15 (No. 11), pp. 214-238, Nov., 1993.

* cited by examiner

Primary Examiner—Edward Coles
Assistant Examiner—Houshang Safaipour

(57) ABSTRACT

A system and method that provided for preview scanning a document and generating a preview scan image, determining a document type based on the preview scan image, mapping the document type to a predetermined workflow, scanning the document to capture an image of the document, and executing the workflow.

23 Claims, 2 Drawing Sheets

SYSTEM AND METHOD OF AUTOMATED SCAN WORKFLOW ASSIGNMENT

TECHNICAL FIELD OF THE INVENTION

This invention relates to digital image capture devices, and more particularly, to a system and method of automated scan workflow assignment.

BACKGROUND OF THE INVENTION

Current scanner technology allows a user to capture and utilize all or portions of various scanned documents, images, objects, etc. for use within various computer applications, even when the documents are comprised of a variety of different components. A document containing text, black and white and/or color photographs, graphics, and color and black and white line art can be scanned in its entirety. Alternatively, the user may choose to select only certain portions of the original document for scanning by utilizing scanner software to select an area or particular image contained in a preview scan of the document. The selected area is then scanned to produce a final image.

Image scanners convert a visible image on a document or photograph, or an image in a transparent medium, into an electronic form suitable for copying, storing or processing by a computer. An image scanner may be a separate device, or an image scanner may be a part of a copier, a camera, a digital sender, a facsimile machine, a multipurpose device or a multifunction device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

SUMMARY OF THE INVENTION

In accordance with an embodiment of the present invention, a method includes the steps of preview scanning a document and generating a preview scan image, determining a document type based on the preview scan image, mapping the document type to a predetermined workflow, scanning the document to capture an image of the document, and executing the workflow.

In accordance with another embodiment of the present invention, a system includes a digital image capture device operable to capture images, a scanning module operable to preview scan a document and generate a preview scan image, and an automated scan workflow module operable to determine a document type based on the preview scan image, map the document type to a predetermined workflow, and executing the workflow.

In accordance with yet another embodiment of the present invention, a scanner includes a scanning module operable to preview scan a document and generate a preview scan image, an automated scan workflow module operable to determine a document type based on the preview scan image, map the document type to a predetermined workflow, and executing the workflow.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
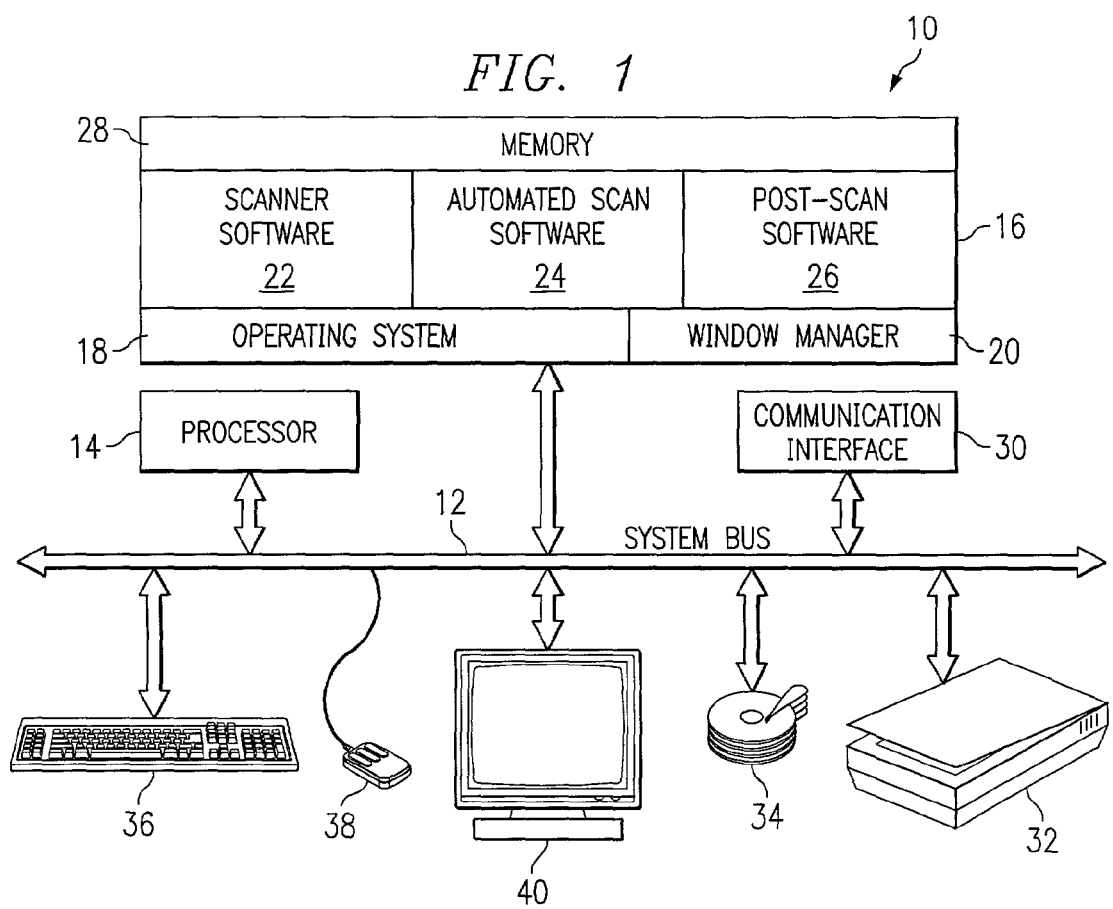
FIG. 1 is a simplified block diagram of a computer system and scanner incorporating the automated workflow assignment process of the present invention.
Figure 2:
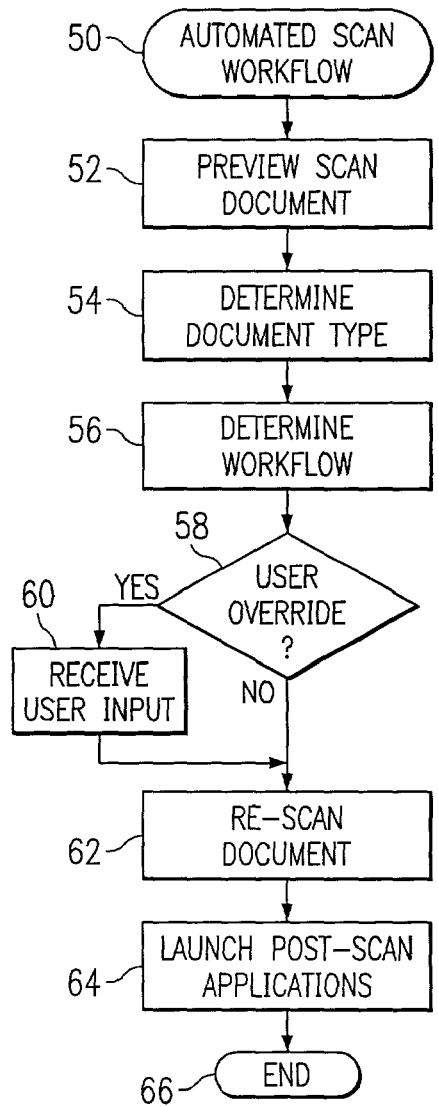
FIG. 2 is a simplified flowchart of an embodiment of the automated scan workflow assignment according to the teachings of the present invention.
Figure 3:
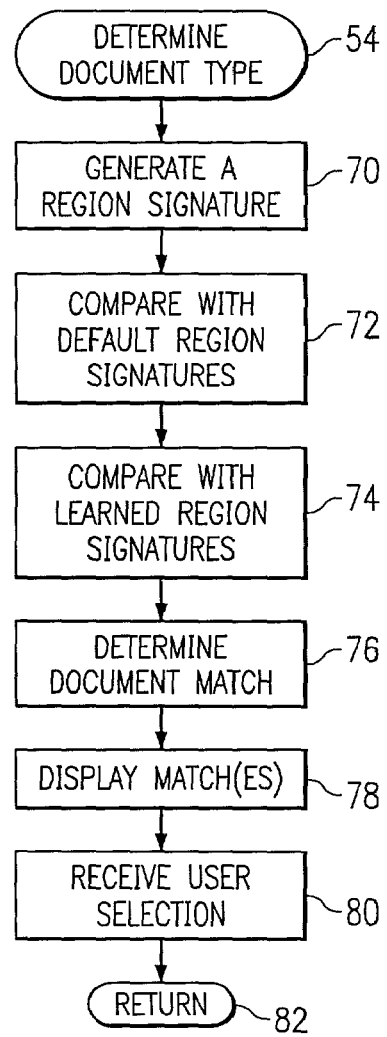
FIG. 3 is a simplified flowchart of an embodiment of a determine document type process according to the teachings of the present invention.

The preferred embodiment of the present invention and its advantages are best understood by referring to FIGS. 1 through 3 of the drawings, like numerals being used for like and corresponding parts of the various drawings.

Although there are many ways to handle a scanned document, for most users, their scanning tasks follow similar workflows for similar types of documents. For example, scanning a text document with a facsimile cover sheet is almost always followed by a facsimile transmission; scanning photographs is almost always followed by editing with an image editor. Rather than providing specialized buttons and menus on the scanner or user interface to handle the common tasks (facsimile, email, web page editor, word processor, image editor, print, file storage, etc.), the present invention makes an analysis of the preview scan to determine the document type and then maps it to a workflow to process the scanned document. Therefore, the user's required input is minimized and the speed and performance of the scanning and image capturing tasks are improved.

FIG. 1 is a simplified block diagram of a computer system and scanner incorporating the automated workflow assignment process of the present invention. One skilled in the art will recognize that many other system configurations are applicable. A computer system 10 includes a system bus 12 interconnecting various system components, including a processor 14 and software applications 16 executing thereon. Software applications 16 are stored in a memory 28 and includes an operating system 18, window manager 20, scanner software 22, automated scan software 24, and post-scan software 26. Computer system 10 may also include a network portal (not shown), wireless devices (not shown), and a server which connects computer system 10 to the Internet. Computer system 10 further includes communication interface(s) 30 receives information and data from sources outside of computer system 10 and allows computer system 10 to communicate therewith. Computer system 10 also includes user interfaces including a keyboard 36, a pointing device 38, and a monitor 40. A data storage device 34 is used to store data and programs in computer system 10 and is accessible by processor 14 and software applications 16 via system bus 12. A scanner 32 is coupled to system bus 12 and is capable of capturing images on documents using scanner software 22 and automated scan software 24 according to the present invention, and converting them into a format that post-scan software can process and manipulate. For example, users may invoke post-scan software such as word processing software, image editing software, photo editing software, facsimile software, web page composing software, etc. to process the scanned images.

FIG. 2 is a simplified flowchart of an embodiment of an automated scan workflow assignment process 50 according to the teachings of the present invention. The user first initiates, in step 52, a preview scan by placing the document on a scan surface or feed the document through a document feeder on scanner 32 and activating a preview scan button on scanner 32 or displayed on monitor 40 by scanner software 22 and/or automated scan software 24. A preview scan is typically a low-resolution scan. The captured image data is analyzed to determine the document type, as shown in step 54. Document types may include text document, photograph, line art, and a combination of text and graphics. Further, step 54 also recognizes whether the document is of a document type defined by predetermined templates of previously scanned documents. In response to the determination of document type, a mapping to a predetermined workflow to process the document is determined in step 56. The workflow may include an identification of a post-scan software application which would be automatically invoked to process the captured image, or one or more process steps that would be carried out to process the captured image. For example, in response to a determination of the document type as a text document, a word processing software application may be automatically invoked and the captured image be placed therein in a format that can be manipulated by the invoked software. As another example, in response to a determination of the document type as a photograph, the captured image is stored as a predetermined file type in a predetermined folder in data storage device 34. Still another example is the invocation of a facsimile software application to transmit the scanned images to a predetermined destination number. The workflows may be "learned" from previous user input in response to the same document types, or specified by the user as his/her preference with respect to particular document types. The workflow determination may be displayed on the scanner screen or on the monitor to provide the user an opportunity to override the workflow assigned by the software and specify an alternate workflow, as shown in steps 58 and 60. After the workflow is determined, the document is re-scanned at a higher resolution setting to capture the final image data, as in step 62. Post-scan application(s) are then launched automatically according to the selected workflow to process the captured document image in step 64. The process ends in step 66. It is contemplated by the present invention that the user may be able to enter the number of pages of the document that should be processed in the same manner using the same workflow. In this fashion, the user is able to leave multiple pages of a document in the scanner document feeder and let computer system 10 automatically handle the scanning and processing of the document without user supervision and input. The user may also leave a number of documents of the same type or different types, and allow the system to handle each automatically. For example, the system may store each document in a format most appropriate for manipulating the document type, including a WORD.doc file, a .jpeg or .tiff, an .xml intermediate, .pdf, etc. The formats with minimal size and ease of document reusability and manipulation may be preferred.

FIG. 3 is a simplified flowchart of an embodiment of a determine document type process 54 according to the teachings of the present invention. Process 54 first generates a region signature of a predetermined region in the captured image by known document analysis methods in step 70. Document analysis techniques are described in publications such as F. M. Wahl, K. Y. Wong, R. G. Casey, "Block Segmentation and Text Extraction in Mixed Text/Image Documents", *Computer Graphics and Image Processing*, v 20, n 4, December 1982, p. 375–390. The background can also be used to discern if a particular automated document feeder, slide adapter, negative adapter, transparency adapter, and the like is being used. Some known methods for extracting an image from a background take advantage of a known contrasting background. In U.S. Pat. No. 4,823,395, the background is black, and a white margin on a manuscript provides a contrasting edge for edge detection. Likewise, in U.S. Pat. No. 5,818,976, the optical characteristics of the background contrast with the optical characteristics of the pages scanned, where the contrasting background may be a shade of gray, a contrasting color, or a pattern of lines or dots. In U.S. Pat. No. 5,901,253, the scanned image is compared to a reference scan line of the background. In U.S. Pat. No. 5,880,858, a background image is obtained by scanning with no document present, and then in a scanned image including a document, pixels corresponding to the background are subtracted. In U.S. Pat. No. 5,978,519, an image is cropped to include portions having variable intensity levels, and portions having uniform intensity levels are excluded from the cropped image.

The region signature is a set of data that describe a portion of the image which may include the size and location of the analyzed region, the relative and absolute distribution, the percent of text-like and image-like information in the region, and any other useful data or characterization that can be used to describe the captured image. For example, the region signature may include data such as percent foreground regions, percent solid regions, and percent nonsolid regions, percent text regions, percent non-text regions, distribution of the text and non-text regions from the center of the page, region relative layout signature, and region absolute layout signature.

The generated region signature is then compared with default region signatures in step 72. Default region signatures may be stock signatures for text documents, photographs, mixed type documents, and other typical document types. Automated scan workflow software may come equipped with these default region signatures to facilitate the ease of use of this feature. The region signature is also compared with learned region signatures in step 74. Learned region signatures are region signatures of previously scanned documents or region signatures of commonly encountered documents that the user has selected to save as templates. Default and learned region signatures may be stored in an XML-DTD directed file, a database, or another file storage format and method. The location of the stored region signatures may be locally or on a remotely located server in communication with computer system 10. For example, computer system 10 may download document region signatures from a server via the Internet. A best document region signature match is determined in step 76 from the comparisons. The one or more matches may be displayed on the scanner screen or on the monitor to allow the user to provide an override selection input, if desired, in steps 78 and 80. The process returns in step 82.

In view of the foregoing, the present invention automatically determines a workflow after analyzing a preview scan of a document and determining the document type. The workflow mapping from a specific document type may be "learned" from previously scanned and handled documents, default workflow assignments, or workflow assignments based on user supplied templates of certain documents. As further examples, if the document type determination recognizes that photographs have been preview scanned, the work flow signature may be: (1) capture photo-specific bit depth and resolution settings, (2) save the scanned images as files of a predetermined image format, (3) open a specific image editor on the computer, and (4) open the image files. As another example, if the process recognizes that the user is using the automatic document feeder and the document is a text document, an automated workflow may be: (1) capture text-specific bit depth and resolution settings, (2) save the scanned images as files of a predetermined text format, (3) open a specific word processor, and (4) create multi-page document in the word processor application. Another example may be the recognition of pages of handwritten notes, which causes the following workflow to be executed: (1) capture images as files of a predetermined format, (2) store the files in a predetermined computer disk drive and path and following a predetermined filename convention. If the region signature matches a previously faxed document, the following workflow may be executed: (1) capture fax quality 1-bit scans of the page, (2) load fax software, (3) attach a header filled out with sender information and displayed for the user to verify before faxing the document.

The present invention provides the benefit of speed and better performance because the scan parameters can be set to the correct bit depth, channel, resolutions, etc. at the beginning of the scan rather than requiring dual scans in which both a high enough resolution and a deep enough bit depth must be captured to enable both more photo-centric and text-centric types of workflows. Further, the automated workflow launches all the post-scan software applications in the right sequence without the user having to provide additional input. The present invention thus provides the users with much needed convenience and ease of use. The scanner need not be equipped with numerous buttons or menus to process the various documents. The user may place all of the documents in the document feeder and allow the automated scan workflow process of the present invention to scan, process, save, transmit, etc. all the documents properly. Additionally, because simple or minimal user interface is required, the present invention can be readily localized to any language. The present invention is applicable to digital image capture devices such as digital senders, multipurpose or multifunction devices, facsimile machines, digital cameras, desktop scanners, handheld scanners, network scanners, etc.

What is claimed is:

1. A method comprising:
   preview scanning a document and generating a preview scan image;
   determining a document type based on the preview scan image;
   mapping the document type to a predetermined workflow for post-scan processing;
   scanning the document to capture an image of the document; and
   executing the workflow.

2. The method, as set forth in claim 1, wherein determining a document type comprises
   generating a region signature of a predetermined portion of the preview scan image;
   comparing the region signature with known region signatures;
   determining a match with a known region signature; and
   determining the predetermined workflow in response to the matched region signature.

3. The method, as set forth in claim 1, wherein determining a document type comprises:
   generating a region signature of a predetermined portion of the preview scan image, the region signature including size and location of the predetermined portion, relative and absolute distribution, and percentage of text and image;
   comparing the region signature with stored region signatures;
   determining a match with at least one stored region signature; and
   determining the predetermined workflow in response to the matched region signature.

4. The method, as set forth in claim 1, wherein determining a document type comprises:
   generating a region signature of the preview scan image;
   comparing the region signature with learned region signatures of previous scan tasks;
   determining a match with a learned region signature; and
   determining the predetermined workflow in response to the matched region signature.

5. The method, as set forth in claim 1, wherein determining a document type comprises:
   generating a region signature of the preview scan image;
   comparing the region signature with stored template region signatures of certain common document types;
   determining a match with a stored template region signature; and
   determining the predetermined workflow in response to the matched region signature.

6. The method, as set forth in claim 1, wherein executing the workflow comprises:
   determining at least one post-scan application for manipulating the scanned image;
   automatically launching the at least one post-scan application; and processing the scanned image.

7. The method, as set forth in claim 1, wherein executing the workflow comprises:
   determining at least one post-scan application for manipulating the scanned image;
   displaying the selection of the at least one post-scan application to solicit user input;
   automatically launching the at least one post-scan application; and processing the scanned image.

8. The method of claim 1, wherein executing the workflow comprises automatically launching a word processing application in response to the region signature being matched to a region signature of a text-centric document.

9. The method, as set forth in claim 1, wherein executing the workflow comprises automatically launching an image editing application in response to the region signature being matched to a region signature of a graphic-centric document.

10. The method, as set forth in claim 1, wherein executing the workflow comprises automatically launching a facsimile application in response to the region signature being matched to a region signature of a facsimile cover sheet.

11. The method, as set forth in claim 1, wherein executing the workflow comprises automatically launching a photo editing application in response to the region signature being matched to a region signature of a photograph.

12. The method, as set forth in claim 1, wherein executing the workflow comprises automatically storing the scanned image in a predetermined format in a predetermined folder in response to the region signature being matched to a region signature of a photograph.

13. The method, as set forth in claim 1, wherein executing the workflow comprises automatically storing the scanned image in an extensible markup language (XML) format in response to the region signature being matched to a region signature of a mixture of text and graphics.

14. The method, as set forth in claim 1, wherein executing the workflow comprises automatically storing the scanned image in a portable document format (.pdf) in response to the response to the region signature being matched to a region signature of a photograph.

15. The method, as set forth in claim 1, wherein executing the workflow comprises automatically storing the scanned image in a database file in response to the region signature being matched to a region signature of a particular format.

16. The method, as set forth in claim 1, wherein executing the workflow comprises automatically launching a web page editing application.

17. A system comprising:
   a digital image capture device operable to capture images;
   a scanning module operable to preview scan a document and generate a preview scan image; and
   an automated scan workflow module operable to determine a document type based on the preview scan image, map the document type to a predetermined workflow for post-scan processing, and executing the workflow.

18. The system, as set forth in claim 17, wherein the digital image capture device is a device selected from the group consisting of a scanner, a copier, a camera, a facsimile device, a digital sender, a multipurpose device, and a multifunction device.

19. The system, as set forth in claim 17, wherein the automated scan workflow module is operable to generate a region signature of a predetermined portion of the preview scan image, compare the region signature with known region signatures, determine a match with a known region signature, and determine the predetermined workflow in response to the matched region signature.

20. The system, as set forth in claim 17, wherein the automated scan workflow module is operable to determine at least one post-scan application for manipulating the scanned image, and automatically launching the at least one post-scan application.

21. A scanner, comprising:
   a scanning module operable to preview scan a document and generate a preview scan image; and
   an automated scan workflow module operable to determine a document type based on the preview scan image, map the document type to a predetermined workflow for post-scan processing, and executing the workflow.

22. The scanner, as set forth in claim 21, wherein the automated scan workflow module is operable to generate a region signature of a predetermined portion of the preview scan image, compare the region signature with known region signatures, determine a match with a known region signature, and determine the predetermined workflow I response to the matched region signature.

23. The scanner, as set forth in claim 21, wherein the automated scan workflow module is operable to determine at least one post-scan application for manipulating the scanned image, and automatically launching the at least one post-scan application.

* * * * *

UNITED STATES PATENT AND TRADEMARK OFFICE
CERTIFICATE OF CORRECTION

PATENT NO. : 6,980,332 B2  Page 1 of 1
APPLICATION NO. : 09/892299
DATED : December 27, 2005
INVENTOR(S) : Steven J. Simske It is certified that error appears in the above-identified patent and that said Letters Patent is hereby corrected as shown below:

In column 5, line 56, in Claim 2, after "comprises" insert -- : --.

In column 6, line 42, in Claim 8, delete "of" and insert -- , as set forth in --, therefor.

In column 8, line 22, in Claim 22, after "workflow" delete "I" and insert -- in --, therefor.

Signed and Sealed this

Nineteenth Day of May, 2009

JOHN DOLL
*Acting Director of the United States Patent and Trademark Office*